No. 746,459. PATENTED DEC. 8, 1903.
F. B. CASE.
LENS CARRIAGE FOR PHOTOGRAPHIC CAMERAS.
APPLICATION FILED DEC. 11, 1902.
NO MODEL.

Witnesses:
Albert C. Bell.
A. P. Moore

Inventor
Frank B. Case.
By his Atty. Wm. H. Cooley.

THE NORRIS PETERS CO., PHOTO-LITHO., WASHINGTON, D. C.

No. 746,459.                                              Patented December 8, 1903.

UNITED STATES PATENT OFFICE.

FRANK B. CASE, OF ROCHESTER, NEW YORK, ASSIGNOR TO SENECA CAMERA COMPANY, OF ROCHESTER, NEW YORK, A CORPORATION OF NEW YORK.

LENS-CARRIAGE FOR PHOTOGRAPHIC CAMERAS.

SPECIFICATION forming part of Letters Patent No. 746,459, dated December 8, 1903.

Application filed December 11, 1902. Serial No. 134,786. (No model.)

*To all whom it may concern:*

Be it known that I, FRANK B. CASE, a citizen of the United States, residing at Rochester, in the county of Monroe and State of New York, have invented an Improved Lens-Carriage for Photographic Cameras, of which the following is a specification.

This invention relates to that class of cameras in which the camera-front or lens-carriage is arranged to slide and to be secured in any desired position of adjustment on a suitable bed-plate constituting a guide for such lens-carriage.

The object of my present invention is to provide a more efficient and economical mechanism for adjustably securing the lens-carriage in any point of its adjustment upon the bed-plate of the carriage.

Figure 1:
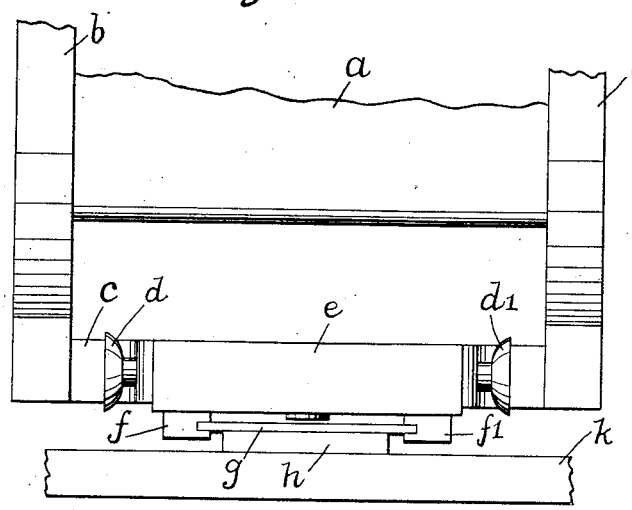
Figure 2:
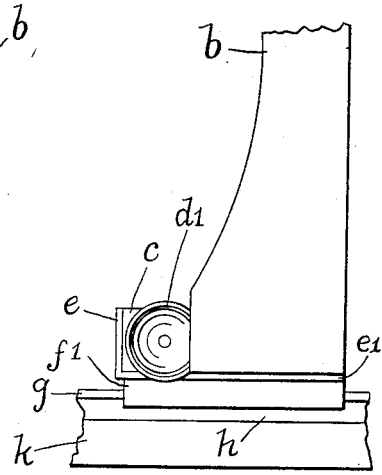
Figure 3:
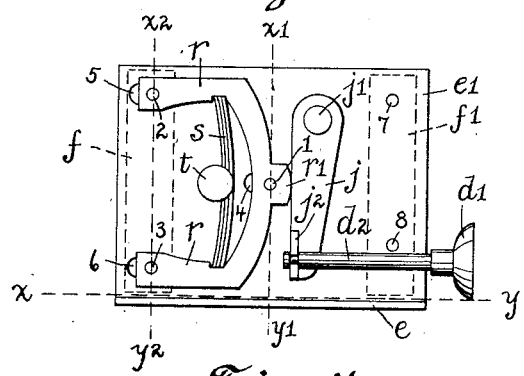
Figure 5:
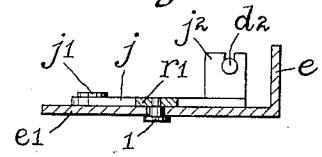
Figure 6:
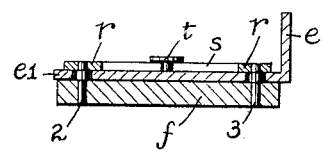
Figure 4:
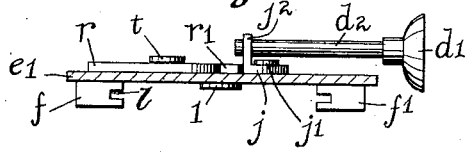
Figure 7:
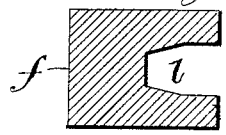

The several views of the accompanying drawings illustrating my invention are as follows:

Figure 1 is a front or face view of so much of the camera front and bed as is necessary to show the means by which I secure the lens-carriage to such bed. Fig. 2 is a side view of the parts shown in Fig. 1. Fig. 3 is a top view of the plate $e'$ seen in Fig. 2 and shows the parts carried thereby. Figs. 4, 5, and 6 are sectional views of the parts shown in Fig. 3, taken along the dotted lines $x\,y$, $x'\,y'$, and $x^2\,y^2$, respectively. Fig. 7 is an enlarged sectional view of the guide $f$, showing the arrangement of the groove therein.

Similar characters refer to similar parts throughout the several views.

Referring to Figs. 1 and 2, the lens-carriage consists of a lens-board $a$, supported from the vertical side pieces $b\,b$, receiving their support from a base-piece $c$. This base-piece $c$ has secured to its lower face a plate $e'$, having a vertical projection $e$ on its outer or front end formed at right angles to the plate $e'$. The plate $e'$ has secured on its under side two grooved guides $f\,f'$, so formed and assembled as to fit and move upon the edges of the flat metallic slide or bed-plate $g$, supported by the blocking $h$ from the camera-bed $k$. All of the parts thus far described are of a construction usual in cameras of this class.

The two cupped finger-buttons $d$ and $d'$ are provided as indicated, so that by means of mechanism to be described pressing such buttons $d$ and $d'$ together increases the distance between the guides $f$ and $f'$, and such guides $f\,f'$, together with the camera-front supported thereby, may be moved longitudinally on the slide $g$ to any desired position. The button $d$ is rigidly secured to the base $c$, while the button $d'$ is rigidly secured to one end of a push-rod $d^2$, the other end of which is grooved so as to fit loosely into a slot in the upper end of the projection $j^2$ on the lever $j$, pivoted at $j'$ to the upper face of the plate $e'$, as indicated in Figs. 3, 4, and 5. This plate $e'$ has also slidably secured to its upper face a frame $r\,r$, having a cam-like projection $r'$ located about opposite to the center of the lever $j$ and so proportioned that the edges of such projection $r'$ and lever $j$ are in contact, as seen in Figs. 3 and 4. The frame $r\,r$ is so secured to the plate $e'$ by rivets or studs 1, 2, and 3 that it cannot be removed from such plate $e'$ and still may be moved laterally upon it. The rivet or stud 1, as shown in Fig. 5, has a central section of larger diameter than the riveted or upper end, such central section being a little longer than the thickness of the plate $e'$, so that the plate $e'$ will not be clamped between the enlarged lower end or head of such stud 1 and the frame $r\,r$ when such stud is riveted into such frame. The rivets or studs 2 and 3 have similarly enlarged central sections to that described for stud 1 and for the same purpose; but instead of being headed at their lower ends, as stud 1 is, they are of smaller diameter than at their central sections and are riveted into the guide $f$, as indicated in Fig. 6. The central sections of the rivets or studs 1, 2, and 3 pass through lateral slots 4, 5, and 6 therefor, respectively, in the plate $e'$, and the fit of the parts is such as to permit the frame $r\,r$ to move freely as far as such slots will allow.

A flat spring $s$, which may consist of a number of leaves, if desired, is secured to the upper face of the plate $e'$ by the enlarged head of the rivet $t$, as seen in Figs. 3 and 6, in such a way that the ends of such spring $s$ press against the frame $r\,r$ and keep such frame in its extreme right-hand position, which is with the rivets 1, 2, and 3 against the right-hand ends of slots 4, 5, and 6, respectively, as seen in Fig. 3, if nothing is between the guides $ff'$ to prevent guide $f$ moving that far. Guide $f'$ is rigidly secured to the plate $e'$ by rivets 7 8, as shown in Fig. 3. In practice the parts are so proportioned that before the frame $r\ r$ has been moved by the spring $s$ to the extreme right-hand position permitted by the slots 4, 5, and 6 the guides $f$ and $f'$ press firmly against the slide or bed-plate $g$, and thus clamp the plate $e'$ and parts carried thereby in any desired position on the slide $g$.

It will be understood that the push-rod $d^2$ operates through a suitable hole therefor in the base $c$ and that such base $c$ has a suitable clearance cut in its under side to accommodate the parts carried on the upper face of the plate $e'$, as is usual with clamping devices of this class. The projection $e$ serves to close up the front and otherwise open end of such clearance.

From the construction just described it will be seen that when it is desired to move the camera-front upon the slide $g$ the buttons $d$ and $d'$ are pressed together, the push-rod $d^2$, projection $j^2$, and lever $j$ are moved to the left, and such lever $j$ presses against the projection $r'$ and moves the frame $r\ r$ to the left against the action of the spring $s$, which frame in turn moves the guide $f$ to the left and relieves the pressure of the guide $f$, and therefore of the guide $f'$, upon the slide $g$, for which condition of affairs the camera-front and slides carried thereby may be easily moved to any desired position. When it is desired to again clamp the camera-front upon the slide $g$, the pressure on the buttons $d$ and $d'$ is relieved and the spring $s$ forces the frame $r\ r$, guide $f$, lever $j$, push-rod $d^2$, and button $d'$ to the right until the guides $f\ f'$ again press firmly against the slide $g$, and thus secure the parts carried by them to such slide.

I have found it desirable to form the grooves in one or both (preferably both) of the slides $f$ in such a way that such grooves have parallel surfaces at their outer edges and with such surfaces arranged to slightly converge near the bottom of the groove $l$, as indicated in Fig. 7, in order that such slides $f$ may more firmly grip the bed-plate $g$, upon which they are arranged to slide.

What I claim is—

1. In a camera, a bed-plate and a lens-carriage arranged to slide thereon, slides carried by such lens-carriage and arranged to work on such bed-plate, one of such slides movable upon the base of such lens-carriage, a spring for holding such movable slide firmly against such bed-plate, a lever arranged to engage such movable slide and to force the same away from contact with such bed-plate, a push-button and connections between such push-button and such lever for operating such lever thereby.

2. In a photographic camera, in combination with a bed-plate and a lens-carriage arranged to slide thereon, two slides carried by such lens-carriage and arranged to work upon such bed-plate, one of such slides movable upon such lens-carriage, such slides having grooves therein to receive and work upon such bed-plate, the groove in one of such slides formed with faces parallel near its outer edges and slightly converging near the bottom of such groove.

3. In a camera, a bed-plate and a lens-carriage arranged to slide thereon, slides carried by such lens-carriage and arranged to work upon such bed-plate, one of such slides movable upon the base of such lens-carriage, a spring for holding such movable slide firmly against such bed-plate, a lever arranged to engage such movable slide and to force the same away from contact with such bed-plate, means accessible from the outside of such slides for operating such lever.

4. In a camera, in combination with the camera-bed, and a runway thereon, of a lens-carriage adjustably mounted on the runway and comprising a plate provided on its under side with two parallel grooved strips which embrace the sides of the runway, one of such strips being fixed and the other movable toward and from the adjacent edge of the runway, a spring arranged to normally hold the movable strip in engagement with the runway, a lever for moving such strip out of engagement with the runway, said lever at its free end being provided with a finger-hold and an arm fixed on the plate and provided with a thumb-rest.

FRANK B. CASE.

Witnesses:
ALBERT C. BELL,
A. PEARL MOORE.